United States Patent
Gaiser et al.

(10) Patent No.: US 7,328,937 B2
(45) Date of Patent: Feb. 12, 2008

(54) BOOT OF A MOTOR VEHICLE

(75) Inventors: Ferdinand Gaiser, Simmozheim (DE); Jens Hantusch, Penig (DE); Thomas Remmen, Gartringen (DE); Klaus Riehle, Bodelshausen (DE); Uwe Schon, Deckenpfronn (DE)

(73) Assignee: DaimlerChrysler AG, Stuttgart (DE)

( * ) Notice: Subject to any disclaimer, the term of this patent is extended or adjusted under 35 U.S.C. 154(b) by 7 days.

(21) Appl. No.: 10/538,366

(22) PCT Filed: Nov. 17, 2003

(86) PCT No.: PCT/EP03/12820

§ 371 (c)(1),
(2), (4) Date: Jan. 11, 2006

(87) PCT Pub. No.: WO2004/052681

PCT Pub. Date: Jun. 24, 2004

(65) Prior Publication Data

US 2006/0119138 A1    Jun. 8, 2006

(30) Foreign Application Priority Data

Dec. 11, 2002   (DE) ................. 102 57 797

(51) Int. Cl.
*B60R 27/00* (2006.01)
(52) U.S. Cl. ................................ 296/187.11
(58) Field of Classification Search ........... 296/187.11, 296/187.08, 187.05, 187.03, 187.01, 203.01, 296/203.04, 35.1, 35.2
See application file for complete search history.

(56) References Cited

U.S. PATENT DOCUMENTS

| 5,549,352 | A  | * | 8/1996  | Janotik et al. | 296/209 |
| 5,738,378 | A  | * | 4/1998  | Yazejian | 280/784 |
| 5,992,921 | A  | * | 11/1999 | Seki | 296/187.09 |
| 6,095,585 | A  |   | 8/2000  | Pilhall | |
| 6,805,401 | B2 | * | 10/2004 | Hayashi et al. | 296/204 |
| 6,824,200 | B2 | * | 11/2004 | Tomita | 296/187.08 |
| 6,857,691 | B2 | * | 2/2005  | Kuroda et al. | 296/203.02 |

FOREIGN PATENT DOCUMENTS

| DE | 298 16 126 U1 | 1/2000 |
| DE | 199 30 763 A1 | 2/2001 |
| DE | 101 00 712 A1 | 7/2002 |
| EP | 1300283 A2 | 4/2003 |

* cited by examiner

*Primary Examiner*—H Gutman
(74) *Attorney, Agent, or Firm*—Crowell & Moring LLP

(57) ABSTRACT

The invention relates to a trunk of a motor vehicle, having a goods rail (14) which is oriented approximately in the direction of the longitudinal axis (L) of the vehicle and is intended for fixing goods to be transported. In the event of a rear impact, penetration into a seat region arranged in front of the trunk is prevented by reducing the effective of the goods rail (14), by the goods rail (14) being composed of at least two partial rails (15, 16). According to the invention, the separating plane (17) between the partial rails (15, 16) runs in an obliquely inclined manner.

13 Claims, 2 Drawing Sheets

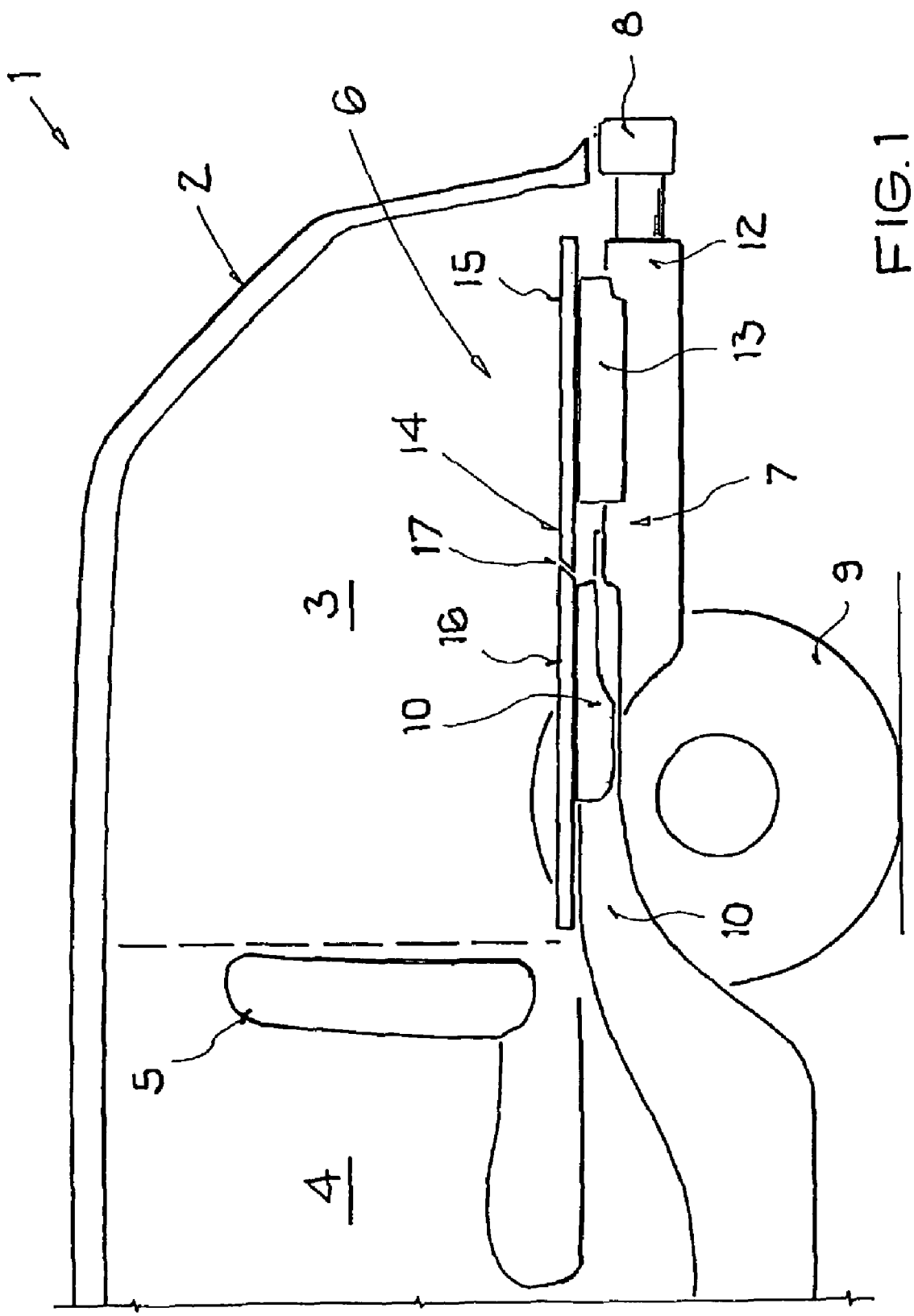

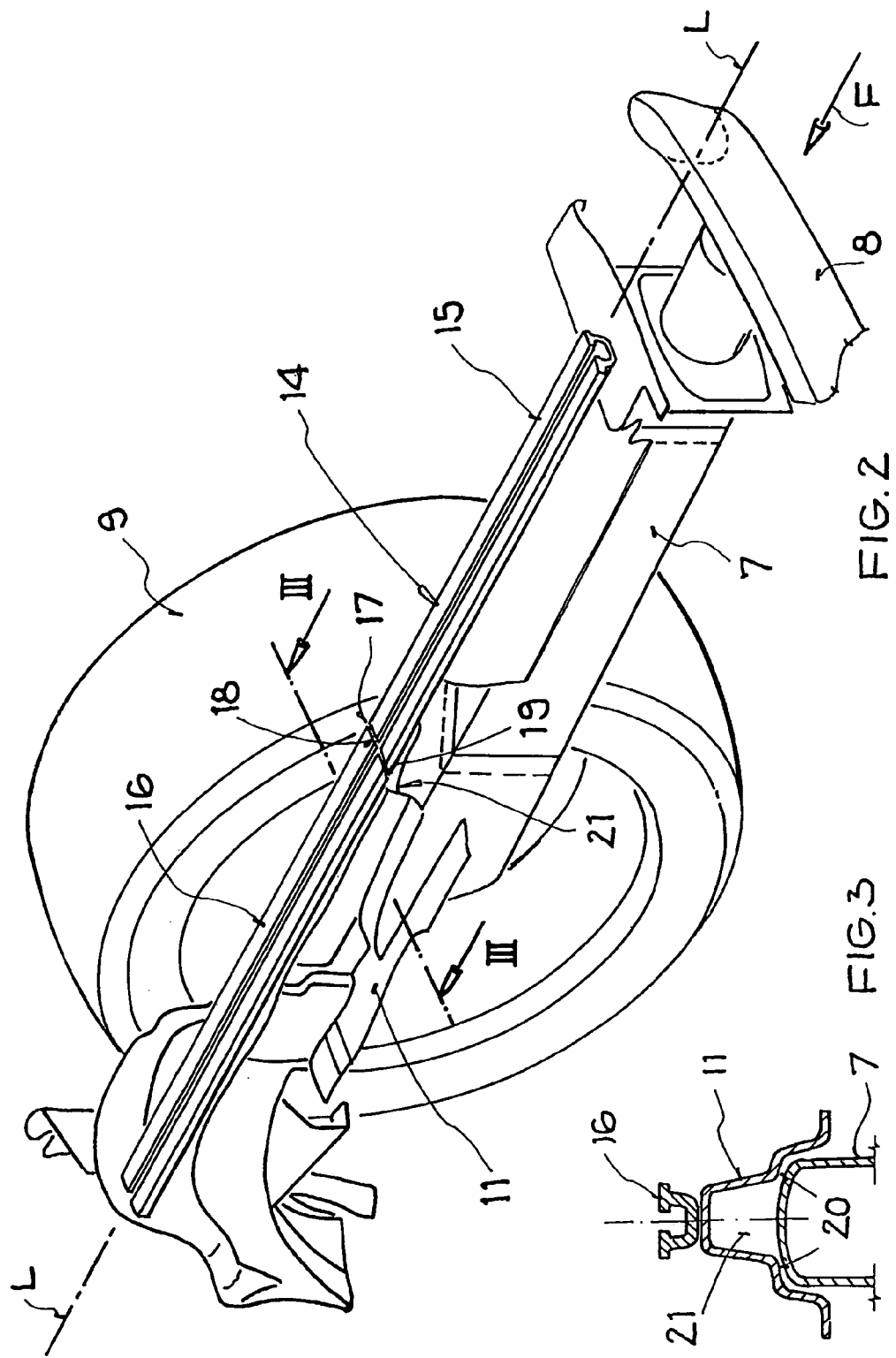

BOOT OF A MOTOR VEHICLE

BACKGROUND AND SUMMARY OF THE INVENTION

The invention relates to a trunk of a motor vehicle having a goods rail which is oriented approximately in the direction of the longitudinal axis of the vehicle and is intended for fixing goods to be transported, and having means which, in the event of a rear impact, prevent penetration into a seat region arranged in front of the trunk by reducing the effective length of the goods rail, the goods rail being composed of at least two partial rails.

DE 199 30 763 A1 discloses a trunk of a motor vehicle having two goods rails running parallel to the longitudinal axis of the vehicle. Goods rails serve to securely fix items being transported. In order to prevent, in the event of a rear impact, the goods rail penetrating into a seat region arranged in front of the trunk, means are provided which reduce the effective length of the goods rail. This reduction takes place in DE 199 30 763 A1 by virtue of the fact that predetermined breaking points which are destroyed in the event of a rear impact are placed into the goods rail, so that the rear region of the goods rail can buckle in the direction of the center of the interior.

The predetermined breaking point is designed as a linear thinning of material which causes the goods rail to buckle. Since the predetermined breaking point is dimensioned as a function of a number of factors, the buckling of the goods rail may be obstructed, for example in the case of an offset rear impact.

It is therefore the object of the invention to provide a trunk of a motor vehicle in which the reduction of the effective length of the goods rail takes place reliably.

The object is achieved according to the invention by having a goods rail which is oriented approximately in the direction of the longitudinal axis of the vehicle and is intended for fixing goods to be transported, and having means which in the event of a rear impact, prevent penetration into a seat region arranged in front of the trunk by reducing the effective length of the goods rail, the goods rail being composed of at least two partial rails, with the separating plane between the partial rails running in an obliquely inclined manner, characterized in that the goods rail is arranged in an overlap with a longitudinal member, with a hollow profile shell being placed onto a region of the longitudinal member that is mounted upstream of the separating plane, so that a cavity which, in the event of a rear impact, receives the rear partial rail is formed between the hollow profile shell and the longitudinal member.

The trunk of a motor vehicle is equipped with at least one goods rail for fixing goods to be transported. The goods rail is composed of at least two partial rails, with, according to the invention, the separating plane between the partial rails running in an obliquely inclined manner. The composition of the partial rails has the effect that, in the event of a rear impact, the rear partial rail is displaced by the deformation of the rear region in the direction of the seat region arranged in front of the trunk while the front partial rail initially remains fixed in position. The movement of the rear partial rail inevitably obtains a direction because of the obliquely inclined separating plane. This direction of movement is selected in such a manner that the rear partial rail is guided or deflected into unproblematic regions of the trunk, i.e., for example, to the side or downward, so that penetration of the trunk rail into the seat region is avoided. It is also advantageous in the case of the solution according to the invention that the division of the trunk rail into two subsections does not involve additional costs and additional weight and nevertheless is a reliable mechanism in the event of a rear impact.

In order to deflect the rear partial rail downward, the separating plane can run in a manner rising from the front to the rear transversely with respect to the longitudinal axis of the vehicle.

The separating plane can preferably be provided approximately in the center of the goods rail. As a result, the effective length of the trunk rail can be reduced to at least half in the event of a rear impact without the rear partial rail penetrating into the seat region.

The goods rail can be arranged in an overlap with a rear longitudinal member. The goods rail can therefore be fixed to the longitudinal member by simple means, so that there is a stable connection between the goods rail and the body.

In one particularly preferred embodiment, a hollow profile shell can be placed onto a region of the longitudinal member that is mounted upstream of the separating plane. The front subsection can be fixed on the hollow profile shell.

A cavity can be formed between the hollow profile shell and the overlapped section of the longitudinal member. In the event of a rear impact, the hollow profile shell takes on the task of receiving the rear subsection which can enter into the cavity between the overlapped section of the longitudinal member and the hollow profile shell.

The cavity can advantageously be designed in such a manner that the rear partial rail is inevitably guided downward not only by the oblique separating plane but also by the shaping of the cavity.

For the fixing of straps or holders, the goods rail can have an upwardly open, U-shaped cross section into which corresponding profiles can be pushed.

One preferred embodiment is explained below with reference to the drawing, in which:

BRIEF DESCRIPTION OF THE DRAWINGS

FIG. 1 shows a side view of a rear region of a motor vehicle, and

FIG. 2 shows a perspective illustration of a trunk rail according to FIG. 1 in a view obliquely from the rear.

FIG. 3 shows a cross sectional view along line III-III of FIG. 2.

FIG. 1 partially illustrates a station wagon 1 with its rear region 2. The rear region 2 has a trunk 3 which is separated from a passenger cell 4 by a seat region 5. The lower end of the trunk 3 is formed by a floor assembly 6 which, inter alia, comprises two longitudinal members 7 running parallel to the longitudinal axis of the vehicle. The longitudinal members 7 extend from a bumper 8, which ends the rear region 2 to the rear, over a rear wheel 9 as far as the passenger cell 4.

A hollow profile shell 11 is fixed on a section 10 of the longitudinal member 7 that faces the seat region 5, and a supporting part 13 is fixed on a rear section 12 of the longitudinal member 7. A goods rail 14 is arranged on the hollow profile shell 11 and the supporting component 13, the goods rail being composed of a rear partial rail 15 and a front partial rail 16.

As illustrated in FIG. 2, the separating plane 17 between the front partial rail 16 and the rear partial rail 15 runs in a manner rising from the front to the rear (as seen in the direction of travel) transversely with respect to the longitudinal axis L of the vehicle at an angle of approximately 45°. In order to obtain the oblique inclination of the separating plane 17, those ends 18 and 19 of the partial rails 16 and 15, respectively, which face the separating plane 17 are beveled at an angle of 45°. The mutually facing ends 18 and 19 are not connected to each other by fixing means, but rather merely bear against each other.

As emerges from the sectional illustration from FIG. 3, the hollow profile shell 11 has an essentially U-shaped cross section. The hollow profile shell 11 rests with two flanges 20 on the profile of the longitudinal member 7, with the shape of the flanges 20 being matched to the profile of the longitudinal member 7. As a result, a cavity 21 is produced between the hollow profile shell 11 and the longitudinal member 7.

The partial rail 16 rests on the upper side of the hollow profile shell 11, the partial rail 16 having an upwardly open, U-shaped cross section.

The hollow profile shell 11 is—as seen in the direction of travel—mounted directly in front of the separating plane 17, so that, in the event of a rear impact, the cavity 21 formed between the hollow profile shell 11 and longitudinal member 7 can serve as a receptacle for the rear partial rail 15 (cf. FIG. 2).

Thus if, in the event of a rear impact, a force F acts on the bumper 8, said force is conducted into the longitudinal member 7. The longitudinal member 7 is reduced by being deformed, so that the rear partial rail 15 is shifted forward approximately parallel to the longitudinal axis L of the vehicle in the direction of the seat region 5. However, because of the inclined separating plane 17, the rear partial rail 15 obtains a deflecting movement under the front partial rail 16. On a further forward movement of the partial rail 15, the latter is received by the cavity 21 of the hollow profile shell 11, so that penetration into the seat region 5 can be reliably prevented.

The invention claimed is:

1. A passenger vehicle trunk arrangement disposed behind a passenger seat region, comprising:
   a longitudinal member extending along a trunk bottom region; and
   a goods rail oriented approximately in a longitudinal direction of the vehicle and serving for fixing goods to be transported; wherein,
   said goods rail is composed of at least a front partial rail and a rear partial rail which are separated by a separating plane between them, said separating plane extending in an obliquely inclined manner so as to prevent said goods rail from penetrating the seat region in the event of a rear impact;
   the goods rail overlaps with the longitudinal member;
   a hollow profile shell is placed onto a region of the longitudinal member that is mounted forward of the separating plane; and
   a cavity is formed between the hollow profile shell and the longitudinal member for receiving the rear partial rail in the event of a rear impact.

2. The passenger vehicle trunk arrangement according to claim 1, wherein the separation plane extends transversely with respect to the longitudinal direction in a manner rising from the front to the rear.

3. The passenger vehicle trunk arrangement according to claim 1, wherein the separating plane extends approximately in a center of the goods rail.

4. The passenger vehicle trunk arrangement according to claim 2, wherein the separating plane extends approximately in a center of the goods rail.

5. The passenger vehicle trunk arrangement according to claim 1, wherein the cavity is designed in such a manner that the rear partial rail is inevitably guided downward.

6. The passenger vehicle trunk arrangement according to claim 1, wherein the goods rail has an upwardly open U-shaped cross section.

7. The passenger vehicle trunk arrangement according to claim 2, wherein the goods rail has an upwardly open U-shaped cross section.

8. The passenger vehicle trunk arrangement according to claim 3, wherein the goods rail has an upwardly open U-shaped cross section.

9. The passenger vehicle trunk arrangement according to claim 4, wherein the goods rail has an upwardly open U-shaped cross section.

10. The passenger vehicle trunk arrangement according to claim 5, wherein the goods rail has an upwardly open U-shaped cross section.

11. A station wagon vehicle comprising:
    a rear seat section;
    a trunk space behind the rear seat section;
    at least one goods rail for fixing goods to be transported, said goods rail extending in a longitudinal direction of the vehicle, and being composed of at least two partial rails, including a rear partial rail and a front partial rail which are separated by a separating plane between them, said separating plane extending in an obliquely inclined manner so as to prevent said goods rail from penetrating the seat region in the event of a rear impact,
    a longitudinal member extending below the goods rail; and
    a hollow profile shell placed onto a region of the longitudinal member that is mounted forward of the separation plane;
    wherein a cavity is formed between the hollow profile shell and the longitudinal member for receiving the rear partial rail in the event of a rear impact.

12. A vehicle according to 11, wherein two of said goods rails are provided, one on each lateral side of the rear seat section.

13. A vehicle according to 11, wherein the separating plane is sloped so as to direct the rear partial rail underneath the adjacent forward partial rail in the event of a rear impact.

* * * * *